(12) United States Patent  
Chiu

(10) Patent No.: US 12,059,740 B2  
(45) Date of Patent: Aug. 13, 2024

(54) WELDING METHOD FOR FLEXIBLE AND ROLLABLE SILICON-BASED SOLAR MODULE

(71) Applicant: Golden Solar (Quanzhou) New Energy Technology Co., Ltd., Quanzhou (CN)

(72) Inventor: Hsin-wang Chiu, Quanzhou (CN)

(73) Assignee: GOLDEN SOLAR (QUANZHOU) NEW ENERGY TECHNOLOGY CO., LTD., Quanzhou (CN)

( * ) Notice: Subject to any disclaimer, the term of this patent is extended or adjusted under 35 U.S.C. 154(b) by 400 days.

(21) Appl. No.: 17/453,865

(22) Filed: Nov. 8, 2021

(65) Prior Publication Data

US 2023/0142665 A1 May 11, 2023

(51) Int. Cl.
| | | |
|---|---|---|
| *B23K 11/00* | (2006.01) | |
| *B23K 11/11* | (2006.01) | |
| *B23K 11/34* | (2006.01) | |
| *B23K 26/38* | (2014.01) | |
| *B23K 101/36* | (2006.01) | |
| *B23K 103/00* | (2006.01) | |

(52) U.S. Cl.
CPC ........... *B23K 11/115* (2013.01); *B23K 11/004* (2013.01); *B23K 11/34* (2013.01); *B23K 26/38* (2013.01); *B23K 2101/36* (2018.08); *B23K 2103/54* (2018.08)

(58) Field of Classification Search
CPC ..... B23K 11/004; B23K 11/115; B23K 11/34; B23K 2101/36; B23K 2101/40; B23K 2103/54; B23K 26/38
USPC ...................................................... 219/86.1
See application file for complete search history.

(56) References Cited

U.S. PATENT DOCUMENTS

| 2019/0081198 A1* | 3/2019 | Morad | ............... H01L 31/0508 |
| 2020/0381577 A1* | 12/2020 | Zhou | ................... H01L 31/0504 |

FOREIGN PATENT DOCUMENTS

EP          3614443 A1      2/2020

OTHER PUBLICATIONS

Wu, Yu-Tao, "Solar Battery Plate Unit; The Photovoltaic Battery Module and Preparation Technique Thereof", Feb. 16, 2018, CN107706249 (Year: 2017).*

* cited by examiner

*Primary Examiner* — Dana Ross  
*Assistant Examiner* — Joseph W Iskra  
(74) *Attorney, Agent, or Firm* — Bayramoglu Law Offices LLC

(57) ABSTRACT

A welding method for a new flexible and rollable silicon-based solar module includes the following steps: cutting a cell piece into a small piece cell string including N small piece cells without splitting; cutting a hard protective layer into N small pieces according to a size of a small piece cell; allowing the cut hard protective layer to be covered on and bonded to a glue-dispensed small piece cell string to form a small string cell piece; arranging the small string cell pieces into a small standard piece according to a required size distribution, and covering the small standard piece with an adhesive film; welding positive electrodes and negative electrodes of the small standard pieces in series simultaneously to form a 1P standard part; and arranging the 1P standard parts, and fixing the 1P standard parts by bonding the adhesive films to each other to form a 5P standard part.

5 Claims, 5 Drawing Sheets

WELDING METHOD FOR FLEXIBLE AND ROLLABLE SILICON-BASED SOLAR MODULE

CROSS REFERENCE TO THE RELATED APPLICATIONS

This application is a new application filing in US by PARIS CONVENTION without claiming priority.

TECHNICAL FIELD

The present invention relates to the technical field of solar module, and more particularly, to a welding method for a new flexible and rollable silicon-based solar module.

BACKGROUND

In the traditional welding method and process, a hard protective layer is completely covered on the front of the small cell piece, so the protective layer can only be glue-dispensed and fitted after the interconnecting strip is welded, resulting in that the small cell piece will be welded without protection. Since the silicon-based cell is fragile, operating without protection can easily damage the cell, which affects the quality of the finished product. In the traditional welding method, the small cell is completely divided into pieces and then the pieces are arranged, so the process is more tedious, and the degree of automation is not high, affecting the production capacity.

SUMMARY

In view of the above problems, the present invention provides a welding method for a new flexible and rollable silicon-based solar module, and the welding method propose to attach a hard protective layer to the front side of a silicon-based cell; the broken probability of the small cell piece is reduced, the production loss is reduced, and the quality of the finished product is improved.

In order to solve the above technical problems, the technical solution adopted by the present invention is as follows. A welding method for a new flexible and rollable silicon-based solar module includes the following steps:
  cutting a cell piece into a small piece cell string including N small piece cells without splitting by laser cutting;
  cutting a hard protective layer into N small pieces according to a size of a small piece cell;
  allowing the cut hard protective layer to be covered on and bonded to a glue-dispensed small piece cell string by an automatic arrangement equipment to form a small string cell piece;
  arranging the small string cell pieces into a small standard piece according to a required size distribution, and covering the small standard piece with an adhesive film;
  welding positive electrodes and negative electrodes of the small standard pieces covered with the adhesive film in series simultaneously by an automatic welding equipment to form a 1P standard part; and
  arranging the 1P standard parts by the automatic arrangement equipment, and fixing the 1P standard parts by bonding the adhesive films to each other to form a 5P standard part.

Further, the cell piece adopts a silicon-based heterojunction solar cell piece and is cut into a small piece cell string including 13 small piece cells.

Further, each small piece cell of the small piece cell string is 12 mm in length and 7.84 mm in width; a positive electrode and a negative electrode of the small piece cell are respectively arranged at an end of a front side and an end of a back side of the small piece cell; and a negative electrode welding spot is located below an opposite direction of a positive electrode welding spot, or directly below the positive electrode welding spot. When the negative electrode welding spot is directly below the positive electrode welding spot, the welded negative electrode strip can protect the positive electrode that is not covered by the hard protective layer, to prevent the exposed part from breaking due to unprotected.

Further, the hard protective layer adopts a transparent glass.

Further, in the step of welding the positive electrodes and the negative electrodes of the small standard pieces covered with the adhesive film in series simultaneously by the automatic welding equipment to form the 1P standard part, a positive electrode welding strip adopts a square welding strip with a side length of 0.3-0.4 mm, and a negative electrode welding strip adopts a welding strip of 0.1 mm×1.2 mm.

From the above description of the structure of the present invention, it can be seen that compared with the prior art, the present invention has the following advantages.

1. In the present invention, a hard protective layer is first attached to the cell piece for protecting the chip, and then the welding operation is performed. The hard protective layer avoids the front welding spot of the cell piece, and the safety performance of the small cell piece is greatly improved during the welding operation. In this way, the broken probability of the small cell piece is reduced, the production loss is reduced, the quality of the finished product is improved, and the rate of good products and the degree of production automation are greatly improved.

2. In the present invention, the negative electrode welding spot of the chip is designed to be directly below the positive electrode of the chip, which protects the fragile parts of the chip, thereby reducing the defective rate of the production product. In terms of the welding spot, the electroplating process is adopted to increase the reliability of the welding spot.

3. In the present invention, the production process is simplified, that is, the whole process only involves twice arrangements and twice serial welding for forming the module.

BRIEF DESCRIPTION OF THE DRAWINGS

The drawings, as a part of the application, are used to provide a further understanding of the present invention, and the schematic embodiments of the present invention and descriptions thereof are used to explain the present invention and do not constitute an undue limitation of the present invention. In the drawings.

Figure 5:
Figure 6:
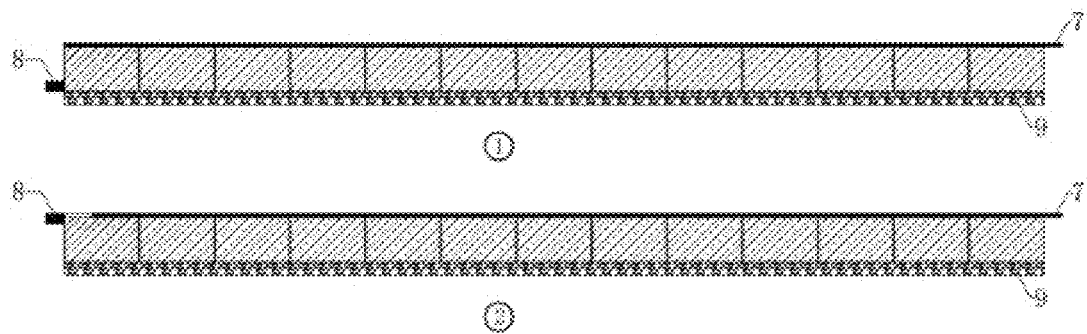
Figure 7:
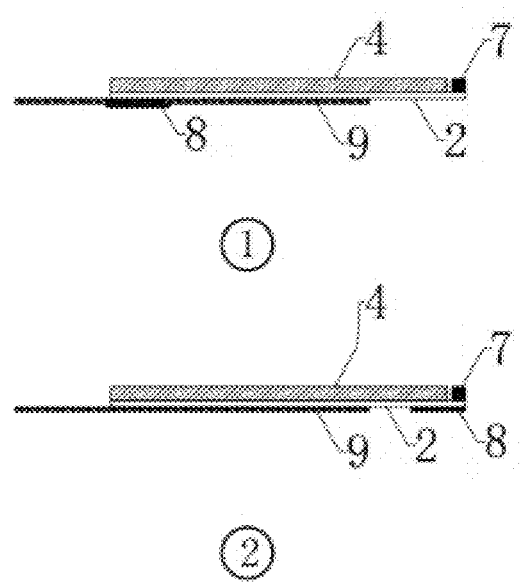
Figure 8:
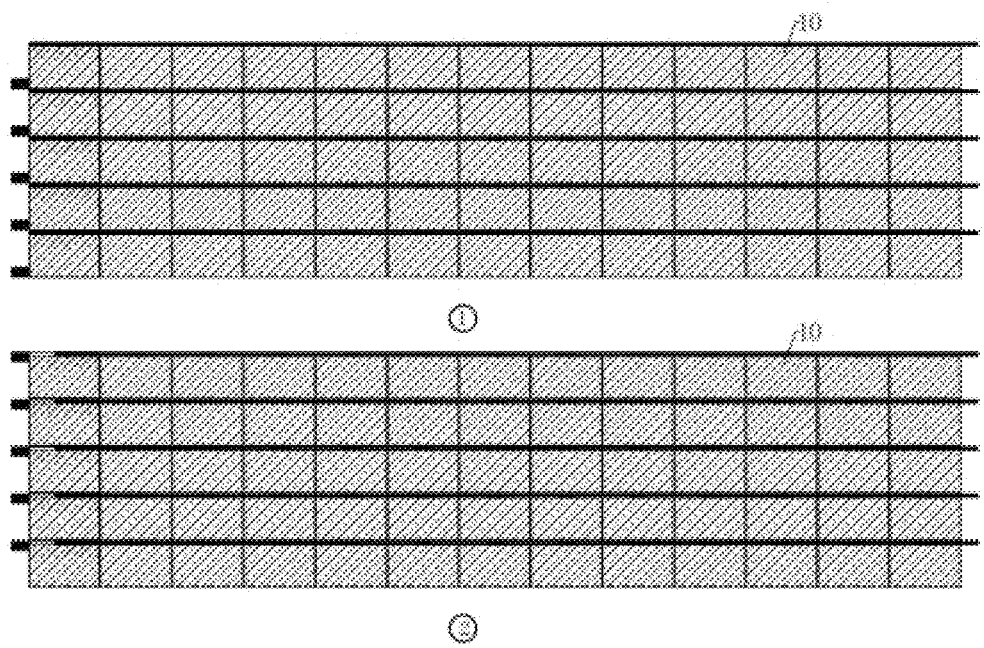
Figure 9:
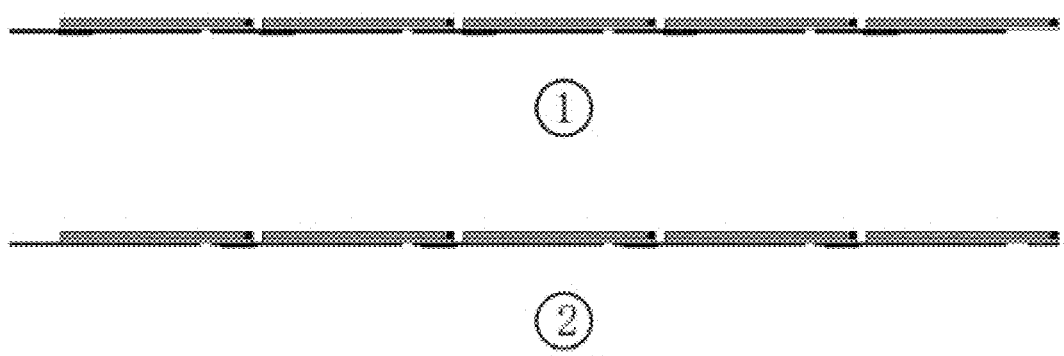

FIG. 5 is a structural schematic diagram of the expanded piece arranged into the small standard piece according to the embodiment of the present invention;

FIG. 6 is a structural schematic diagram of two types of the negative electrode positions of the 1P standard part according to the embodiment of the present invention;

FIG. 7 is a side structural schematic diagram of two types of the negative electrode positions of the 1P standard part according to the embodiment of the present invention;

FIG. 8 is a structural schematic diagram of two types of the negative electrode positions of the 5P standard part according to the embodiment of the present invention;

FIG. 9 is a side structural schematic diagram of two types of the negative electrode positions of the 5P standard part according to the embodiment of the present invention.

DETAILED DESCRIPTION OF THE EMBODIMENTS

In order to make the objectives, technical solutions, and advantages of the present invention clearer, the present invention is further described in detail below in combination with the drawings and embodiments. It should be understood that the specific embodiments described herein are used only to explain the present invention and are not used to limit the present invention.

Figure 1:
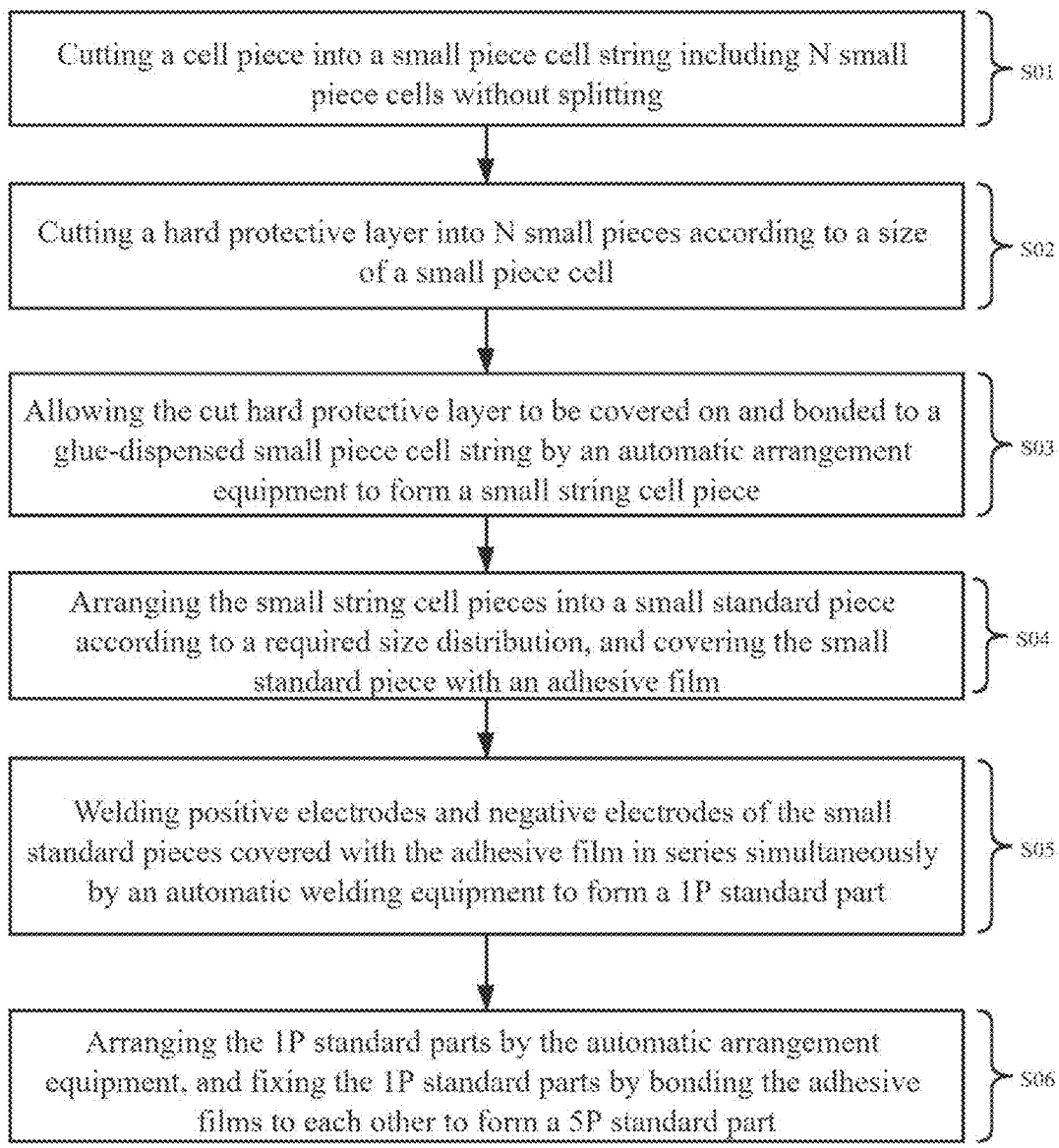
FIG. 1 is a flow chart of a welding method for a new flexible and rollable silicon-based solar module of the present invention.
Figure 2:
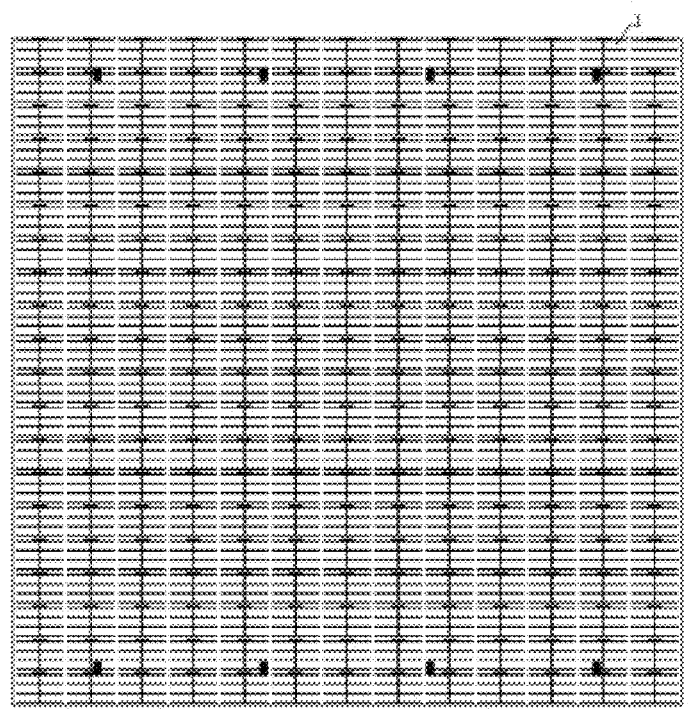
FIG. 2 is a schematic diagram of a silicon-based heterojunction solar cell according to an embodiment of the present invention.
Figure 3:
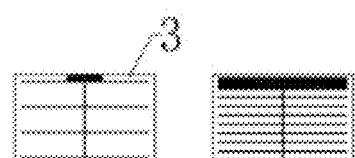
FIG. 3 is a schematic diagram of two types of the negative electrode arrangement of the small piece cell according to the embodiment of the present invention.
Figure 3:
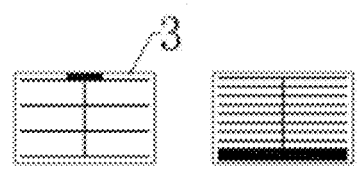
Figure 4:
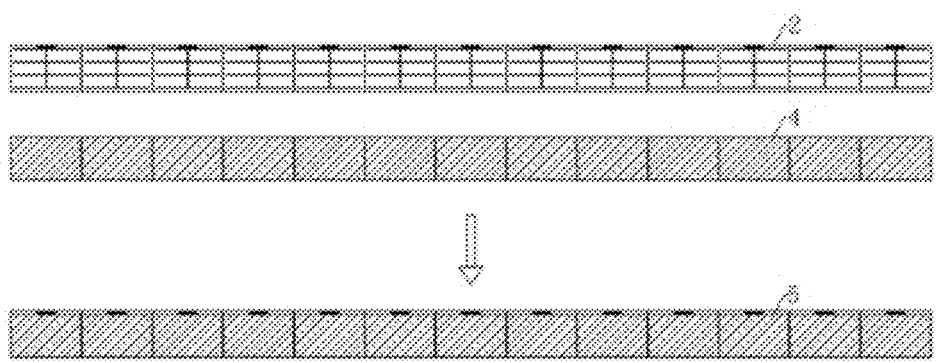
FIG. 4 is a structural schematic diagram of the silicon-based cell cut into the small piece cell string including 13 small piece cells to fit with the transparent glass according to the embodiment of the present invention.

As shown in FIG. 1, a welding method for a new flexible and rollable silicon-based solar module includes the following steps:

S01: a cell piece is cut into a small piece cell string including N small piece cells without splitting by laser cutting. The positive electrode and the negative electrode of the small piece cell are respectively arranged at an end of the front side and an end of the back side of the small piece cell. The negative electrode welding spot is located below the opposite direction of the positive electrode welding spot, or directly below the positive electrode welding spot. When the negative electrode welding spot is directly below the positive electrode welding spot, the welded negative electrode strip can protect the positive electrode that is not covered by a hard protective layer, to prevent the exposed part of the positive electrode from breaking due to unprotected.

S02: the hard protective layer is cut into N small pieces according to the size of the small piece cell.

S03: the cut hard protective layer is covered on and bonded to the glue-dispensed small piece cell string by the automatic arrangement equipment to form a small string cell piece.

S04: small string cell pieces are arranged into a small standard piece according to the required size distribution, and then the small standard piece is covered with an adhesive film.

S05: the positive electrodes and the negative electrodes of the small standard pieces covered with the adhesive film are welded in series simultaneously by the automatic welding equipment to form a 1P standard part. During welding, the positive electrode welding strip adopts a square welding strip with a side length of 0.3-0.4 mm, and the negative electrode welding strip adopts a welding strip of 0.1 mm×1.2 mm.

S06: the 1P standard parts are arranged by the automatic arrangement equipment, and are fixed by bonding the adhesive films to each other to form a 5P standard part.

Embodiment

Referring to FIGS. 1-9, a welding method for a new flexible and rollable silicon-based solar module includes the following steps:

S01. The cell piece 1 adopts the silicon-based heterojunction solar cell piece 1 and is cut into the small piece cell string 2 including 13 small piece cells without splitting. Each small piece cell 3 is 12 mm in length and 7.84 mm in width. The positive electrode and the negative electrode of the small piece cell 3 are respectively arranged at an end of the front side and an end of the back side of the small piece cell 3, and a negative electrode welding spot is located below the opposite direction of a positive electrode welding spot, or directly below the positive electrode welding spot.

S02. The transparent glass 4 is cut into 13 small pieces according to the size of the small piece cell 3.

S03. The cut transparent glass 4 is covered on and bonded to the glue-dispensed small piece cell string 2 by the automatic arrangement equipment to form the small string cell piece 5.

S04. The small string cell pieces 5 are arranged into the small standard piece 6 according to the required size distribution, and then the small standard piece 6 is covered with the adhesive film.

S05. The positive electrodes and the negative electrodes of the small standard pieces 6 covered with the adhesive film are welded in series simultaneously by the automatic welding equipment to form the 1P standard part 9. During welding, the positive electrode welding strip 7 adopts the square welding strip with a side length of 0.3-0.4 mm, and the negative electrode welding strip 8 adopts the welding strip of 0.1 mm×1.2 mm. According to the welding spot, the welding position of the welding strip can be designed to be below the opposite direction of the positive electrode welding spot, or directly below the positive electrode welding spot. When the welding position is directly below the positive electrode welding spot, the part not covered by the transparent glass 4 can be protected.

S06. The 1P standard parts 9 are arranged by the automatic arrangement equipment, and are fixed by bonding the adhesive films to each other to form the 5P standard part 10.

The welded 5P standard parts 10 can be flexibly connected in series and parallel into the large cell string according to the demand and then pressed into the flexible cell module.

In the present invention, a hard protective layer is first attached to the cell piece for protecting the chip, and then the welding operation is performed. The hard protective layer avoids the front welding spot of the cell piece, and the safety performance of the small cell piece is greatly improved during the welding operation. In this way, the broken probability of the small cell piece is reduced, the production loss is reduced, the quality of the finished product is improved, and the rate of good products and the degree of production automation are greatly improved.

In the present invention, the negative electrode welding spot of the chip is designed to be directly below the positive electrode of the chip, which protects the fragile parts of the chip, thereby reducing the defective rate of the production product. In terms of the welding spot, the electroplating process is adopted to increases the reliability of the welding spot. Moreover, the production process is simplified, that is, the whole process only involves twice arrangements and twice serial welding for forming the module.

The above are only preferred embodiments of the present invention and are not used to limit the present invention.

Any modifications, equivalent replacements, and improvements made within the spirit and principles of the present invention shall fall within the scope of protection of the present invention.

What is claimed is:

1. A welding method for a flexible and rollable silicon-based solar module, comprising the following steps:
    cutting a cell piece into a small piece cell string comprising N small piece cells without splitting by laser cutting, each of the N small piece cells comprising 12 mm in length and 7.84 mm in width;
    cutting a hard protective layer into N small pieces according to a size of each of the N small piece cells;
    allowing the cut hard protective layer to be covered on and bonded to glue-dispensed on the small piece cell string by an automatic arrangement equipment to form the small piece cell string;
    arranging the small piece cell string into a standard piece according to a specified size distribution, and covering the standard piece with an adhesive film;
    welding positive electrodes of the standard piece covered with the adhesive film in series simultaneously and welding negative electrodes of the standard piece covered with the adhesive film in series simultaneously by an automatic welding equipment to form a 1P standard part; and
    arranging the 1P standard part by the automatic arrangement equipment, and fixing the 1P standard part by bonding the adhesive film to each other to form a 5P standard part.

2. The welding method for the flexible and rollable silicon-based solar module according to claim 1, wherein the cell piece adopts a silicon-based heterojunction solar cell piece and the cell piece is cut into a small piece cell string comprising 13 small piece cells.

3. The welding method for the flexible and rollable silicon-based solar module according to claim 2, wherein N comprises 13; a positive electrode of each of the 13 small piece cells and a negative electrode of each of the 13 small piece cells are respectively arranged at an end of a front side of each of the 13 small piece cells and an end of a back side of each of the 13 small piece cells; and a negative electrode welding spot is located below an opposite direction of a positive electrode welding spot, or directly below the positive electrode welding spot.

4. The welding method for the flexible and rollable silicon-based solar module according to claim 1, wherein the hard protective layer adopts a transparent glass.

5. The welding method for the flexible and rollable silicon-based solar module according to claim 1, wherein in the step of welding the positive electrodes of the standard piece covered with the adhesive film in series simultaneously and welding the negative electrodes of the standard piece covered with the adhesive film in series simultaneously by the automatic welding equipment to form the 1P standard part, a positive electrode welding strip adopts a square welding strip with a side length of 0.3-0.4 mm, and a negative electrode welding strip adopts a welding strip of 0.1 mm×1.2 mm.

* * * * *